(12) United States Patent
Maeda et al.

(10) Patent No.: US 11,634,345 B2
(45) Date of Patent: Apr. 25, 2023

(54) WASTE WATER TREATMENT METHOD AND WASTE WATER TREATMENT APPARATUS

(71) Applicant: ORGANO CORPORATION, Tokyo (JP)

(72) Inventors: Rintarou Maeda, Tokyo (JP); Yuichirou Toba, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 446 days.

(21) Appl. No.: 16/349,739

(22) PCT Filed: Aug. 7, 2017

(86) PCT No.: PCT/JP2017/028606
§ 371 (c)(1),
(2) Date: May 14, 2019

(87) PCT Pub. No.: WO2018/092365
PCT Pub. Date: May 24, 2018

(65) Prior Publication Data
US 2020/0071206 A1 Mar. 5, 2020

(30) Foreign Application Priority Data
Nov. 16, 2016 (JP) .............................. JP2016-223317

(51) Int. Cl.
*C02F 1/56* (2023.01)
*C02F 1/52* (2023.01)
(Continued)

(52) U.S. Cl.
CPC .............. *C02F 1/56* (2013.01); *C02F 1/5245* (2013.01); *C02F 1/5281* (2013.01); *B01D 21/00* (2013.01);
(Continued)

(58) Field of Classification Search
None
See application file for complete search history.

(56) References Cited

U.S. PATENT DOCUMENTS

| 5,861,100 A | 1/1999 | Nagasaki |
| 2015/0197435 A1* | 7/2015 | Shimizu .................... C02F 1/56 210/732 |

FOREIGN PATENT DOCUMENTS

| CN | 1181355 A | 5/1998 |
| CN | 104619650 A | 5/2015 |

(Continued)

OTHER PUBLICATIONS

Office Action in Indian Application No. 201917018129, dated Feb. 7, 2020.
Office Action issued in Chinese Patent Application No. 201780070015.7 dated Jun. 16, 2021, along with English translation thereof.
(Continued)

*Primary Examiner* — Clare M Perrin
(74) *Attorney, Agent, or Firm* — Greenblum & Bernstein, P.L.C.

(57) ABSTRACT

In an insoluble material-generating apparatus, an iron salt and/or an aluminum salt, and a cationic polymer flocculant, are added to waste water containing dissolved substances to generate insoluble material. To the insoluble material-containing waste water, an anionic polymer flocculant is added, after which the waste water containing the anionic polymer flocculant and the insoluble material is stirred in a granulating flocculation precipitation tank, the insoluble material is granulated, and solid-liquid separation of the generated granulated material is performed to obtain treated water. The amount of the iron salt or the aluminum salt added is an iron or aluminum concentration of at least 0.4 mmol/L, and the cationic polymer flocculant and the anionic polymer flocculant are added so that the product of the cationic polymer (Continued)

flocculant concentration and the cationic group percentage is equal to or less than the product of the anionic polymer flocculant concentration and the anionic group percentage.

4 Claims, 3 Drawing Sheets

(51) Int. Cl.
*B01D 21/00* (2006.01)
*B01D 21/01* (2006.01)
*C02F 1/00* (2023.01)
*B03D 3/02* (2006.01)
*B03D 3/06* (2006.01)

(52) U.S. Cl.
CPC .............. *B01D 21/01* (2013.01); *B03D 3/02* (2013.01); *B03D 3/06* (2013.01); *C02F 1/00* (2013.01); *C02F 2209/06* (2013.01); *C02F 2303/26* (2013.01)

(56) References Cited

FOREIGN PATENT DOCUMENTS

| JP | 2-261505 | 10/1990 |
| JP | 2004-255349 | 9/2004 |
| JP | 2007-275757 | 10/2007 |
| JP | 2011-139997 | 7/2011 |
| JP | 2011-194306 | 10/2011 |
| JP | 5621260 | 10/2014 |
| JP | 5907273 | 4/2016 |
| WO | 2014/038537 | 3/2014 |

OTHER PUBLICATIONS

Official Communication issued in International Application No. PCT/JP2017/028606, dated Oct. 3, 2017.
Office Action issued in corresponding Chinese Patent Application No. 201780070015.7 dated Mar. 26, 2021, along with English Translation thereof.
Office Action in corresponding CN Application No. 201780070015.7, dated Jan. 4, 2022, along with an English translation thereof.

\* cited by examiner

WASTE WATER TREATMENT METHOD AND WASTE WATER TREATMENT APPARATUS

TECHNICAL FIELD

The present invention relates to techniques of a treatment method and a treatment apparatus for waste water containing dissolved substances.

BACKGROUND

In various industrial waste water, besides suspended substances, toxic ionic dissolved substances, or non-ionic dissolved substances such as silica are often contained at high concentrations, and these substances are often removed from waste water by insolubilizing the substances with metal salts, flocculating, and subjecting the substances to solid-liquid separation.

For example, for fluorine and its compounds, which are dissolved substances in waste water, since a waste water standard (8 mg/L, sea area: 15 mg/L) is provided, it is necessary to treat until it is below the waste water standard when discharging. The concentration of fluorine contained in waste water varies, from 10 mg/L to 10,000 mg/L, but for the treatment of waste water with a fluorine concentration of several tens to several thousands mg/L, the flocculation precipitation method is usually the most efficient, and the method generally used.

Generally, fluorine is contained in the form of fluoride ions, and for the treatment of fluoride ions in the above concentration range, a calcium salt is first added such that at least several hundred mg/L of residual calcium remain and most of the fluoride ions are made into calcium fluoride, an insoluble substance, then a metal salt such as an aluminum salt and an anionic polymer flocculant are added to flocculate the calcium fluoride particles.

Moreover, when removing dissolved organic substances, or dissolved silica, that are remaining in small quantity in the treated water after biologically treating the organic substances and nitrogen components in the waste water, a metal salt such as an aluminum salt or an iron salt is also added to insolubilize them, and a solid-liquid separation is performed. Moreover, when toxic metal ions such as zinc and cadmium are contained, an iron salt is added to insolubilize them by coprecipitation with iron, and a solid-liquid separation is performed.

There is the pellet forming solid-liquid separation method as a method for increasing the solid-liquid separation speed of flocculates.

For example, according to Non Patent Literature 1, there is provided a method, wherein an aluminum salt is added to raw water, which is assumed to be river water and the like containing turbid matter, and the turbid matter particles are flocculated, then an anionic polymer flocculant is added, and introduced into a tank equipped with a stirring blade, and the flocculates are granulated by allowing the flocculates to flow with the stirring blade, and a solid-liquid separation is performed. With this method, a solid-liquid separation speed with a linear velocity of about 10 m/h can be obtained.

Moreover, in Patent Literature 1 and 2, a pellet forming solid-liquid separation method for paper making waste water and waste water containing turbid matter is disclosed, and it is shown that a high solid-liquid separation speed can be obtained by using both an anionic polymer flocculant and a cationic polymer flocculant.

CITATION LIST

Patent Literature

Patent Literature 1: JP 5621260 B
Patent Literature 2: JP 5907273 B

Non Patent Literature

Non Patent Literature 1: A Fluidized Pellet Bed Technique for High Rate Solid/Liquid Separation of High-Turbidity Water, Journal of Japan Water Works Association, vol. 62, No. 2 (No. 701), p 34-48

SUMMARY

However, even if the methods of Non Patent Literature 1 or Patent Literature 1 and 2 are applied for the treatment of waste water containing dissolved substances, since the particle size of the granulated material formed during the granulation step is small, it is difficult to obtain a high solid-liquid separation speed.

Therefore, it is an advantage of the present invention to provide a waste water treatment method and a waste water treatment apparatus that can form a granulated material with a large particle size and obtain a high solid-liquid separation speed in the treatment of waste water containing dissolved substances.

(1) A waste water treatment method according to the present embodiment includes an insoluble material-generating step of generating an insoluble material by adding at least either one of an iron salt and an aluminum salt, and a cationic polymer flocculant, to waste water containing dissolved substances, an addition step of adding an anionic polymer flocculant to the waste water containing the insoluble material, a granulation step of granulating the insoluble material by stirring the anionic polymer flocculant and the waste water containing the insoluble material, and a solid-liquid separation step of performing a solid-liquid separation of the generated granulated material to obtain treated water, wherein the amount of the iron salt or the aluminum salt added is an iron or aluminum concentration of 0.4 mmol/L or more, and the cationic polymer flocculant and the anionic polymer flocculant are added such that the product of the cationic polymer flocculant concentration and the cationic group percentage is equal to or less than the product of the anionic polymer flocculant concentration and the anionic group percentage.

(2) The waste water treatment method according to (1), wherein the cationic group percentage of the cationic polymer flocculant is preferably in the range of 1 mol % to 8 mol %.

(3) The waste water treatment method according to (1) or (2), wherein the pH of the waste water in the granulation step is preferably in the range of 7.4 to 8.5.

(4) A waste water treatment apparatus according to the present embodiment includes insoluble material-generating means for generating an insoluble material by adding at least either one of an iron salt and an aluminum salt, and a cationic polymer flocculant, to waste water containing dissolved substances, addition means for adding an anionic polymer flocculant to the waste water containing the insoluble material, stirring means for granulating the insoluble material by stirring the anionic polymer flocculant and the waste water containing the insoluble material, and solid-liquid separation means for performing a solid-liquid separation of the generated granulated material to obtain treated water, wherein the amount of the iron salt or the aluminum salt added is an iron or aluminum concentration of 0.4 mmol/L or more, and the cationic polymer flocculant and the anionic polymer flocculant are added such that the product of the cationic polymer flocculant concentration and the cationic group percentage is equal to or less than the product of the anionic polymer flocculant concentration and the anionic group percentage.

(5) The waste water treatment apparatus according to (4), wherein the cationic group percentage of the cationic polymer flocculant is preferably in the range of 1 mol % to 8 mol %.

(6) The waste water treatment apparatus according to (4) or (5), wherein the pH of the waste water when granulating the insoluble material is preferably in the range of 7.4 to 8.5.

According to the present embodiment, a granulated material with a large particle size can be formed and a high solid-liquid separation speed can be obtained in the treatment of waste water containing dissolved substances.

DESCRIPTION OF EMBODIMENTS

The following describes an embodiment of the present invention. The present embodiment is an example for implementing the present invention, and the present invention is not limited to the present embodiment.

Figure 1:
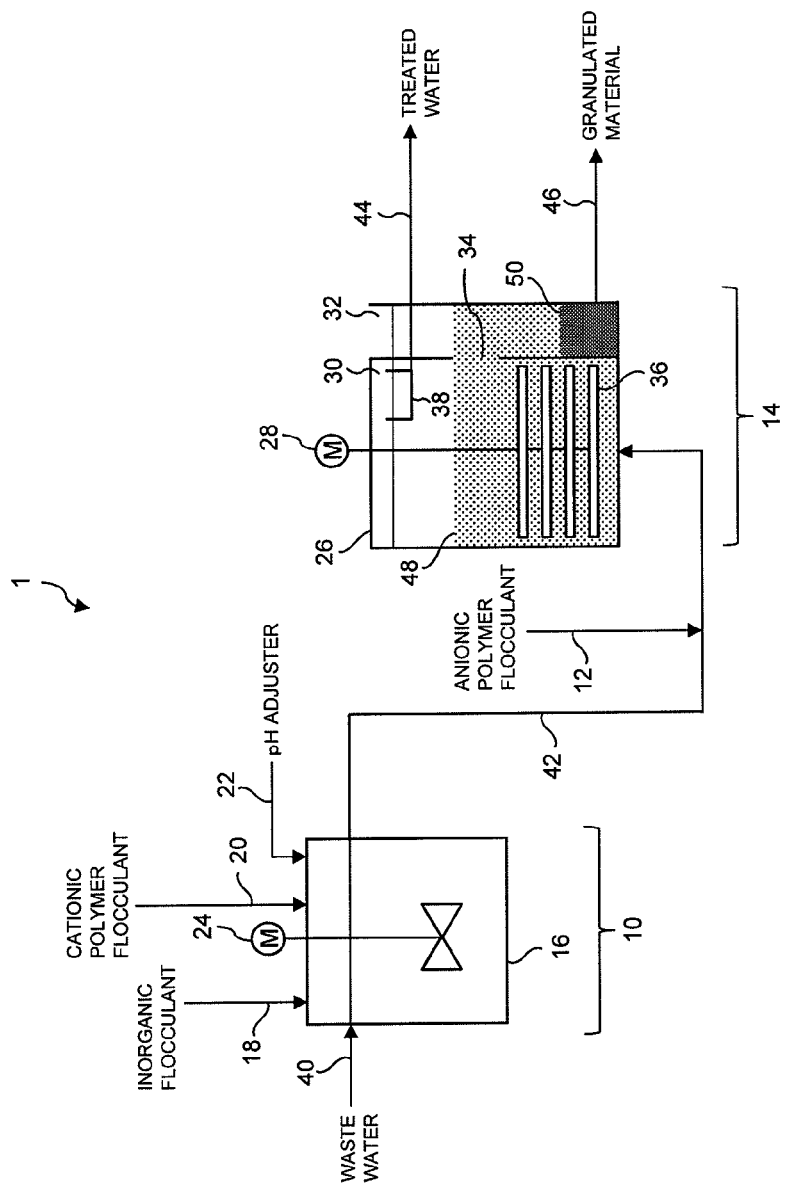
FIG. 1 is a schematic diagram showing an example of the constitution of a waste water treatment apparatus according to the present embodiment.

FIG. 1 is a schematic diagram showing an example of the constitution of a waste water treatment apparatus according to the present embodiment. The waste water treatment apparatus 1 shown in FIG. 1 includes an insoluble material-generating apparatus 10, an anionic polymer flocculant addition line 12 and a solid-liquid separation apparatus 14.

The insoluble material-generating apparatus 10 includes a reaction tank 16, an inorganic flocculant addition line 18, a cationic polymer flocculant addition line 20 and a pH adjuster addition line 22. A stirrer 24 is installed in the reaction tank 16.

The solid-liquid separation apparatus 14 includes a granulating flocculation precipitation tank 26 and a stirrer 28. The granulating flocculation precipitation tank 26 is divided into a main body part 30 and a sludge discharge part 32, and the main body part 30 and the sludge discharge part 32 communicate through an opening part 34. A stirring blade 36 of the stirrer 28 is installed in the main body part 30. The stirring blade 36 is located below the opening part 34. Moreover, an overflow type treated water extraction part 38 is provided on the upper part of the main body part 30.

As shown in FIG. 1, a waste water inflow line 40 is connected to a waste water inlet of the reaction tank 16. Moreover, the inorganic flocculant addition line 18, the cationic polymer flocculant addition line 20, and the pH adjuster addition line 22 are connected to each chemical agent inlet of the reaction tank 16. Moreover, one end of a waste water discharge line 42 is connected to a waste water outlet of the reaction tank 16, and the other end of the waste water discharge line 42 is connected to the main body part 30 of the granulating flocculation precipitation tank 26. Moreover, the anionic polymer flocculant addition line 12 is connected to the waste water discharge line 42. Moreover, a treated water discharge line 44 is connected to the treated water extraction part 38 that is installed on the main body part 30. Moreover, a sludge discharge line 46 is connected to the sludge discharge part 32.

The following describes an example of operation of the waste water treatment apparatus 1 according to the present embodiment.

The waste water containing dissolved substances passes through the waste water inflow line 40, is supplied to the reaction tank 16 and stirred by the stirrer 24. Moreover, while a prescribed amount of the inorganic flocculant is supplied to the reaction tank 16 from the inorganic flocculant addition line 18, a prescribed amount of the cationic polymer flocculant is supplied to the reaction tank 16 from the cationic polymer flocculant addition line 20. Moreover, a pH adjuster such as an acid agent or an alkali agent is supplied to the reaction tank 16 from the pH adjuster addition line 22, as needed. The inorganic flocculant supplied to the reaction tank 16 may contain at least either one of an iron salt and an aluminum salt. The dissolved substances in the waste water are insolubilized by adding a prescribed amount of the iron salt or the aluminum salt to the waste water, and the flocculation of the generated insoluble material is promoted to obtain a flocculated insoluble material by adding a prescribed amount of the cationic polymer flocculant to the waste water (insolubilization step).

The waste water containing the insoluble material passes through the waste water discharge line 42 from the reaction tank 16 and is supplied to the main body part 30 of the granulating flocculation precipitation tank 26. At this point, a prescribed amount of the anionic polymer flocculant is added to the waste water flowing through the waste water discharge line 42 from the anionic polymer flocculant addition line 12 (anionic polymer flocculant addition step). The anionic polymer flocculant is supplied along with the waste water to the main body part 30 of the granulating flocculation precipitation tank 26. In the main body part 30, the anionic polymer flocculant and the insoluble material in the waste water are stirred by the stirring blade 36. This allows the insoluble material to become entangled with the anionic polymer flocculant and to form a granulated material with a large particle size (granulation step). The granulated material formed in the main body part 30 is molded into a shape close to a sphere for example, and the water encapsulated in the granulated material is pushed out (dewatered) by the mechanical shearing force exerted by the stirring blade 36, to become a granulated material with a high specific gravity.

In the present embodiment, it is preferable to inject in advance a prescribed amount of the granulated material to the main body part 30 of the granulating flocculation precipitation tank 26 and to form a dense layer 48 of the granulated material. Introducing the waste water to the main body part 30 in upflow while this dense layer 48 is stirred by the stirring blade 36 allows the insoluble material in the waste water to contact the granulated material in the dense layer 48, and to deposit on the granulated material surface in the dense layer 48 by the action of the anionic polymer, to form a granulated material with a large particle size. Moreover, as described above, the molding and dewatering of the formed granulated material is performed by the mechanical shearing force of the stirring blade 36.

Moreover, in the main body part 30, when the waste water passes through the dense layer 48 in upflow, the water that has passed through the dense layer 48 becomes a clear treated water, since the insoluble material in the waste water is trapped in the dense layer 48 (solid-liquid separation step). A part of the granulated material formed in the main body part 30 is deposited at the bottom of the sludge discharge part 32. The granulated material 50 that has been deposited at the bottom of the sludge discharge part 32 is discharged from the sludge discharge line 46. Moreover, the clear treated water from which the granulated material has been removed overflows the treated water extraction part 38 and is discharged from the treated water discharge line 44. The granulated material discharged from the sludge discharge line 46 is disposed of after performing, for example, condensation, dewatering, etc. Moreover, the granulated material discharged from the sludge discharge line 46 may be sent back directly to the reaction tank 16 or the waste water discharge line 42 before the addition of the anionic polymer, or it may be sent back via a sludge regenerating tank.

The following describes the waste water treatment conditions etc.

Examples of the dissolved substances in the waste water to be treated include dissolved organic substances, dissolved heavy metals, fluoride ions and silica. The waste water treatment of the present embodiment is suitable for waste water with a dissolved substance concentration of 30 to 1000 mg/L, and may also contain suspended substances besides the dissolved substances.

The waste water containing the dissolved substances may be waste water from any origin, and examples include fluorine-containing waste water discharged during an etching process in the electronic industry and the like, fluorine-containing desulfurization waste water discharged at thermal power plants and the like, phosphorus-containing waste water discharged from liquid crystal panel or semiconductor plants, and phosphorus-containing waste water discharged from sewage treatment plants.

The amount of the iron salt or the aluminum salt added is not particularly limited as long as it is an iron or aluminum concentration of 0.4 mmol or more, and is preferably in the range of 0.4 to 3 mmol, more preferably in the range of 0.4 to 2 mmol. This amount added is an amount in excess to the amount added necessary to flocculate the suspended substances. Furthermore, it is considered that, by adding the iron salt or the aluminum salt in the above amount added to the waste water, it is possible to efficiently insolubilize the dissolved substances in the waste water, since not only do the iron or aluminum and the dissolved substances bind together, but a hydroxide of iron or aluminum is also formed, and the dissolved substances are adsorbed on this hydroxide. Even if more than 3 mmol/L are added, the insolubilization of the dissolved substances does not progress much, and a large amount of sludge from the above hydroxide may be generated.

Examples of the iron salts include ferrous salts such as ferrous chloride and polyferrous sulfate, and ferric salts such as ferric chloride and polyferric sulfate. Moreover, examples of the aluminum salts include aluminum sulfate and polyaluminum chloride.

Since the hydroxides of aluminum have a higher adsorptivity to fluoride ions than the hydroxides of iron, when fluoride ions are contained as dissolved substances in the waste water, an aluminum salt is preferably used. Moreover, when dissolved heavy metals or organic substances are contained in the waste water, a ferric salt is preferably used. When silica is contained in the waste water, it may be either an iron salt or an aluminum salt. Moreover, when a combination of fluoride ions, dissolved organic substances and the like are contained in the waste water, both an iron salt and an aluminum salt may be used together.

In the present embodiment, in addition to the aluminum salts and iron salts, alkaline earth metal salts such as calcium and magnesium may be used together.

The cationic polymer flocculant and the anionic polymer flocculant are added such that the product of the cationic polymer flocculant concentration in the waste water (Ac) and the cationic group percentage is equal to or less than the product of the anionic polymer flocculant concentration in the waste water (Aa) and the anionic group percentage. That is, the flocculants are added such that the following formula (1) is satisfied.

$$Ac \times \text{cationic group percentage}/Aa \times \text{anionic group percentage} \leq 1 \quad (1)$$

Here, the cationic group percentage of the cationic polymer flocculant is the mole ratio of cationic monomers to the total molar amount of the copolymerizing nonionic monomers and the cationic monomers. Moreover, the anionic group percentage of the anionic polymer flocculant is the mole ratio of anionic monomers to the total molar amount of the copolymerizing nonionic monomers and the anionic monomers.

In the treatment system, adding iron salts or aluminum salts in excess to the waste water containing dissolved substances, such as the present embodiment, results in the insoluble material becoming overall positively charged, but when Ac×cationic group percentage/Aa×anionic group percentage does not satisfy the above range, it is considered that the positive charge of the insoluble material is not canceled and is maintained as it is. Furthermore, since it is considered that the insoluble materials having a positive charge repel each other and that the flocculation properties are low, forming a granulated material with a large particle size is difficult even when performing a granulation step. On the other hand, in the treatment system, by adding iron salts or aluminum salts in excess to the waste water containing dissolved substances, when Ac×cationic group percentage/Aa×anionic group percentage is equal to or more than 1, it is considered that the positive charge of the insoluble material is canceled. As a result, the granulation step allows the insoluble materials to easily flocculate with each other, to form a granulated material with a large particle size and to improve the solid-liquid separation speed.

Ac×cationic group percentage/Aa×anionic group percentage may be equal to or less than 1, but in terms of forming a granulated material with a larger particle size and further improving the solid-liquid separation speed, it is preferably equal to or less than ⅝.

In terms of promoting the formation of a granulated material with a large particle size and improving the solid-liquid separation speed while the amount of the iron salt or the aluminum salt added is large, the cationic group percentage of the cationic polymer flocculant is preferably 8 mol % or less, and more preferably 1 mol % or more and 8 mol % or less. Having a cationic group percentage in the above range is expected to contribute to the formation of a granulated material with a large particle size, since the ratio of hydrogen bonding part by non-ionic chain needed for the coarsening of the insoluble material becomes large.

Examples of the cationic polymer flocculants include dimethylaminoethyl acrylate methyl chloride quaternary salt (DAA) and dimethylaminoethyl methacrylate methyl chloride quaternary salt (DAM). The molecular weight of the cationic polymer flocculant is, for example, preferably 7,000,000 or more, and more preferably 10,000,000 or more.

The cationic polymer flocculant is, for example, preferably added as a solution in which, as the amount of the flocculant itself added, 0.5 to 10 mg/L is dissolved in water with a concentration of 0.05 to 0.3 w/v %. When the amount added is less than 0.5 mg/L, it may take time to form a granulated material with a large particle size. Moreover, even if the amount added exceeds 10 mg/L, the effect of increasing the particle size of the granulated material becomes small, whereas the amount used increases.

In terms of promoting the forming of the granulated material with a large particle size and improving the solid-liquid separation speed while the amount of the iron salt or the aluminum salt added is large, the anionic group percentage of the anionic polymer flocculant is, for example, preferably 4 mol % or more, and more preferably 4 mol % or more and 30 mol % or less. Having an anionic group percentage in the above range is expected to contribute to the formation of a granulated material with a large particle size, since the ratio of hydrogen bonding part by non-ionic chain needed for the coarsening of the insoluble material becomes large, and the positive charge of the insoluble material can be canceled.

Examples of the anionic polymer flocculants include the polymer of acrylamide with acrylic acid. The molecular weight of the anionic polymer flocculant is, for example, preferably 10,000,000 or more, and more preferably 15,000,000 or more.

The anionic polymer flocculant is, for example, preferably added as a solution in which, as the amount of the flocculant itself added, 0.5 to 10 mg/L is dissolved in water with a concentration of 0.05 to 0.3 w/v %. When the amount added is less than 0.5 mg/L, it may take time to form a granulated material with a large particle size. Moreover, even if the amount added exceeds 10 mg/L, the effect of increasing the particle size of the granulated material becomes small, whereas the amount used increases.

The pH of the waste water when insolubilizing/flocculating the dissolved substances by adding an iron salt or an aluminum salt to the reaction tank 16 is, for example, preferably adjusted to the range of 6.0 to 8.5. When the pH of the waste water is less than 6.0, the insoluble material may dissolve again, or the amount of the hydroxide of iron or aluminum generated may decrease, which will increase the amount of dissolved substances remaining in the waste water and decrease the water quality of the treated water finally obtained. Moreover, when the pH of the waste water exceeds 8.5, the amount of the hydroxide of iron or aluminum generated may also decrease, which will increase the amount of dissolved substances remaining in the waste water and decrease the water quality of the treated water finally obtained. The iron salt or the aluminum salt is desirably added as an acid solution. Therefore, since adding an iron salt or an aluminum salt to the waste water generally decreases the pH of the waste water, an alkali agent is added as a pH adjuster used for adjusting the pH of the waste water. Examples of the alkali agents include sodium hydroxide and calcium hydroxide.

The reaction time of the iron salt or the aluminum salt with the waste water is, for example, preferably in the range of 5 min. to 60 min. When the reaction time is shorter than 5 min., the final water quality of the treated water may decrease, since the dissolved substances in the waste water may not be sufficiently adsorbed on the hydroxide of iron or aluminum. Moreover, when the reaction time exceeds 60 min., it becomes difficult to further allow the insolubilization of the dissolved substances to progress, and a reaction tank with a large capacity becomes necessary.

The pH of the waste water when flocculating the insoluble material by adding a cationic polymer flocculant to the reaction tank 16 is, for example, preferably in the range of 6.0 to 8.6. The reaction time of the cationic polymer flocculant with the waste water is, for example, preferably in the range of 1 min. to 60 min. When the reaction time is shorter than 1 min., it may not be possible to mix and disperse the cationic polymer flocculant in the waste water and the insoluble material may not flocculate sufficiently. Moreover, when the reaction time exceeds 60 min., it becomes difficult to further allow the flocculation of the insoluble material to progress, and a reaction tank with a large capacity becomes necessary.

The timing for adding the cationic polymer flocculant may be either before, simultaneously with, or after adding the iron salt or the aluminum salt, but in terms of efficiently flocculating the insoluble material, simultaneously with or after adding the iron salt or the aluminum salt is preferable. When adding simultaneously, the waste water pH and the reaction time are desirably adapted to the addition conditions of the iron salt or the aluminum salt.

The injection point of the anionic polymer flocculant is not limited to the waste water discharge line 42, and may be, for example, the reaction tank 16. Alternatively, another reaction tank may be installed on the waste water discharge line 42, and the anionic polymer flocculant may be added to this reaction tank.

The granulating flocculation precipitation tank 26 shown in FIG. 1 has been described by taking as an example a continuous type that discharges the treated water while passing the waste water, but it is not limited thereto and may be a batch type. In the case of a batch type, preferably, the stirring blade 36 is installed at a position close to the bottom of the granulating flocculation precipitation tank 26, and the insoluble material is granulated by applying mechanical shearing force to the insoluble material between the stirring blade 36 and the bottom of the granulating flocculation precipitation tank 26. Moreover, the molding and dewatering of the granulated material is performed by the mechanical shearing force of the stirring blade 36. In the case of a batch type, desirably, the stirrer 28 is stopped after the granulation step and the granulated material and the treated water are subjected to solid-liquid separation by static precipitation.

As an indicator of the stirring force of the stirrer 28, the G value represented by the following formula is, for example, preferably in the range of 20 to 100 (1/s). Rotating the stirring blade 36 of the stirrer 28 in such a way that the G value be in the above range makes it possible to obtain a granulated material with a larger particle size and makes it possible to further increase the solid-liquid separation speed.

$$G = \sqrt{\frac{P}{V \times \mu}} \quad \text{[Expression 1]}$$

$P$: Stirring Energy (W)

$V$: Tank capacity (m³)

$\mu$: Viscosity coefficient of water (kg/(m·s))

The pH of the waste water in the granulation step is, for example, preferably in the range of 6.0 to 8.5, and more preferably in the range of 7.4 to 8.5. Having the pH of the waste water in the granulation step in the above range allows increase in the particle size of the granulated material and enables further increase in the solid-liquid separation speed. The pH of the waste water in the granulation step is adjusted, for example, by adjusting the pH of the waste water in the reaction tank 16. If slaked lime (calcium hydroxide), a calcium agent, is added to the waste water, the pH of the waste water in the granulating flocculation precipitation tank 26 may be higher than the pH of the waste water in the reaction tank 16, since the undissolved slaked lime dissolves and releases hydroxide ions between the reaction tank 16 and the granulating flocculation precipitation tank 26. In such a case, it is preferable to, for example, install a pH sensor on the dense layer 48 in the main body part 30 or on the upper part of the dense layer, and to adjust the amount of the added pH adjuster that is supplied to the reaction tank 16, such that the value measured by this pH sensor is in the above range.

According to the present embodiment, it is possible to generate a granulated material with a particle size of 5 to 15 mm and a sedimentation rate of about 20 to 60 m/h. Furthermore, in the case of a batch type granulating flocculation precipitation tank, the solid-liquid separation speed can be, for example, 15 to 45 m/h in linear velocity (LV) when passing the water (the settling time of the static precipitation is for example 5 min. to 30 min.). Moreover, in the case of a continuous type granulating flocculation precipitation tank, the solid-liquid separation speed can be, for example, 10 to 30 m/h in linear velocity (LV).

In the present embodiment, the granulating flocculation precipitation tank 26 which performs the granulation step and the solid-liquid separation step in a single layer is preferably used, but it is not limited thereto, and, for example, a granulation type flocculation tank that performs the granulation step and a solid-liquid separation apparatus that performs the solid-liquid separation of the generated granulated material to obtain the treated water, may be provided.

Figure 2:
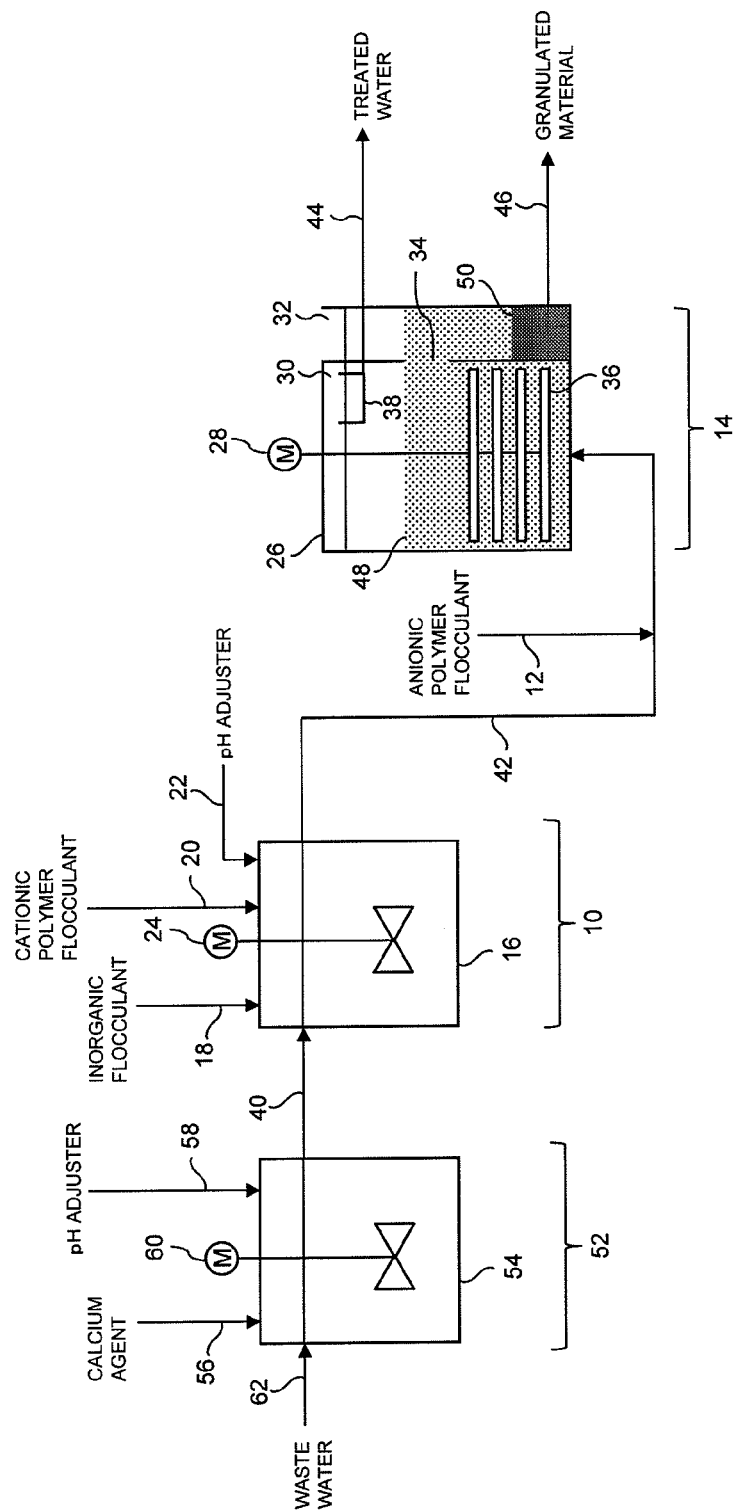
FIG. 2 is a schematic diagram showing an example of the constitution of a waste water treatment apparatus according to another embodiment.

FIG. 2 is a schematic diagram showing an example of the constitution of a waste water treatment apparatus according to another embodiment. In the waste water treatment apparatus 2 shown in FIG. 2, the same reference signs are assigned for the same configuration as the waste water treatment apparatus 1 shown in FIG. 1 and their explanation is omitted. The waste water treatment apparatus 2 shown in FIG. 2 is effective in cases where fluoride ions, which are dissolved substances, are contained in the waste water. The waste water treatment apparatus 2 shown in FIG. 2 includes a pretreatment apparatus 52 in the preceding stage of the reaction tank 16. The pretreatment apparatus 52 includes a pretreatment tank 54, a calcium agent addition line 56 and a pH adjuster addition line 58. A stirrer 60 is installed in the pretreatment tank 54.

A waste water inflow line 62 is connected to a waste water inlet of the pretreatment tank 54. Moreover, one end of the waste water inflow line 40 is connected to a waste water outlet of the pretreatment tank 54, and the other end of the waste water inflow line 40 is connected to the waste water inlet of the reaction tank 16. Moreover, the calcium agent addition line 56 and the pH adjuster addition line 58 are connected to each chemical agent inlet of the pretreatment tank 54.

The following describes an example of operation of the waste water treatment apparatus 2 shown in FIG. 2.

The waste water containing fluoride ions is supplied to the pretreatment tank 54 from the waste water inflow line 62. Then, a prescribed amount of a calcium agent is supplied to the pretreatment tank 54 from the calcium agent addition line 56, and, if necessary, a pH adjuster is supplied to the pretreatment tank 54 from the pH adjuster addition line 58. In the pretreatment tank 54, the fluoride ions react with the calcium agent and, for example, an insoluble material of calcium fluoride is formed. The waste water containing the insoluble material of calcium fluoride, the residual fluoride ions and the other dissolved substances passes through the waste water inflow line 40 from the pretreatment tank 54, and is supplied to the reaction tank 16. In the reaction tank 16, as described above, the residual fluoride ions and the other dissolved substances are insolubilized by an iron salt or an aluminum salt and a cationic polymer flocculant, and the insoluble material is flocculated. Then, after adding an anionic polymer flocculant to the waste water containing the insoluble material, the granulation of the insoluble material and the solid-liquid separation of the generated granulated material are performed in the granulating flocculation precipitation tank 26.

Examples of the calcium agents include calcium hydroxide (slaked lime) and calcium chloride. The calcium agent is preferably added to the waste water as a slurry suspended in water at 5 to 30 w/v %. The amount of the calcium agent added is preferably the amount at which the residual calcium concentration in the waste water discharged from the pretreatment tank 54 is about 100 to 700 mg/L. When the residual calcium concentration is less than 100 mg/L, since the amount of residual fluoride ions in the waste water increases, the amount of the iron salt or the aluminum salt necessary to reduce this may further increase. Moreover, even if the residual calcium concentration is 700 mg/L or more, it is difficult to further allow the insolubilization of the fluoride ions in the waste water to progress.

The pH of the waste water in the pretreatment tank 54 is, for example, preferably adjusted to the range of 6 to 10. When the pH of the waste water is less than 6, since the amount of residual fluoride ions in the waste water increases, the amount of the iron salt or the aluminum salt necessary to reduce this may further increase. Moreover, when the pH of the waste water exceeds 10, if silica is present in the waste water, since the fluoride ions react with silica to become $SiF_6^-$ and the like and flow out in the following stages, the amount of the iron salt or the aluminum salt necessary to reduce this may further increase.

Examples of the pH adjusters supplied to the pretreatment tank 54 include acid agents such as hydrochloric acid and sulfuric acid, and alkali agents such as sodium hydroxide.

The reaction time of the calcium agent with the waste water is, for example, preferably in the range of 5 min. to 60 min. When the reaction time is shorter than 5 min., the amount of calcium fluoride generated may decrease and a large number of fluoride ions may flow out in the following stages. Moreover, when the reaction time exceeds 60 min., it becomes difficult to further allow the insolubilization of the fluoride ions remaining in the waste water to progress, and a pretreatment tank 54 with a large capacity may be necessary.

EXAMPLES

The present invention will be described more concretely below, by showing Examples and Comparative Examples, but the present invention is not limited to the following Examples.

The water quality of the artificial waste waters containing fluoride ions (waste water 1 and waste water 2) treated in the Examples and Comparative Examples is shown in Table 1.

TABLE 1

| Analysis item | Waste water 1 | Waste water 2 |
|---|---|---|
| pH | 8.0 | 7.0 |
| F | 530 mg/L | 50 mg/L |
| Ca2+ | <1 mg/L | <1 mg/L |
| $SO_4$ | 190 mg/L | 220 mg/L |
| Electroconductivity | 3600 μS/cm | 1400 μS/cm |

The anionic polymer flocculants (anionic polymers A and B) and the cationic polymer flocculants (cationic polymers C to F) used in the Examples and the Comparative Examples are shown in Table 2.

TABLE 2

| Name | Component | Anionic group percentage or cationic group percentage | Molecular weight (10,000) |
|---|---|---|---|
| Anionic polymer A | PAA | 4 mol % | 1800 |
| Anionic polymer B | PAA | 22 mol % | 1300 |
| Cationic polymer C | DAM | 5 mol % | 800 |
| Cationic polymer D | DAA | 8 mol % | 850 |
| Cationic polymer E | DAA | 10 mol % | 1000 |
| Cationic polymer F | DAA | 45 mol % | 700 |

*PAA: Polymer of acrylamide with acrylic acid
*DAM: Dimethylaminoethyl methacrylate methyl chloride quaternary salt
*DAA: Dimethylaminoethyl acrylate methyl chloride quaternary salt Example 1-1

500 mL of waste water 1 was poured into a beaker. Next, a slaked lime suspension, which is a calcium agent, was added in such a way as to reach 1650 mg/L and the mixture was stirred with a stirring blade at pH 9.0 with a stirring speed of 150 rpm for 15 min. Next, aluminum sulfate, which is an aluminum salt, was added in such a way as to reach an aluminum concentration of 0.94 mmol and was stirred with a stirring blade at pH 7.0 with a stirring speed of 150 rpm for 10 min. Next, the cationic polymer C as shown in Table 2 was added in such a way as to reach 1 mg/L and was stirred with a stirring blade with a stirring speed of 150 rpm for 1 min. Then, the anionic polymer A as shown in Table 2 was added in such a way as to reach 2 mg/L, stirred with a stirring blade with a stirring speed of 50 rpm for 10 min, and the insoluble material generated in the waste water was granulated. A static precipitation was performed on the obtained waste water, and the treated water (supernatant water) and the granulated material were separated.

Example 1-2

Except for changing the anionic polymer A used in Example 1-1 to the anionic polymer B, the same treatment as in Example 1-1 was performed.

Example 1-3

Except for changing the cationic polymer C used in Example 1-1 to the cationic polymer D, the same treatment as in Example 1-1 was performed.

Comparative Example 1-1

Except for not adding the cationic polymer C used in Example 1-1 and changing the addition of the anionic polymer A from 2 mg/L to 3 mg/L, the same treatment as in Example 1-1 was performed.

Comparative Example 1-2

Except for not adding the cationic polymer C used in Example 1-1 and changing the addition of 2 mg/L of the anionic polymer A to the addition of 3 mg/L of the anionic polymer B, the same treatment as in Example 1-1 was performed.

Comparative Example 1-3

Except for changing the addition of the cationic polymer C used in Example 1-1 from 1 mg/L to 3 mg/L, and not adding the anionic polymer A, the same treatment as in Example 1-1 was performed.

Comparative Example 1-4

Except for changing the cationic polymer C used in Example 1-1 to the cationic polymer E, the same treatment as in Example 1-1 was performed.

Comparative Example 1-5

Except for changing the cationic polymer C used in Example 1-1 to the cationic polymer F, the same treatment as in Example 1-1 was performed.

Examples 2-1 to 2-3

In Examples 2-1 to 2-3, except for changing the waste water 1 to the waste water 2, both shown in Table 1, adding a suspension of slaked lime in such a way as to reach 710 mg/L, and adding aluminum sulfate in such a way as to reach 260 mg/L (0.41 mmol in aluminum concentration), the same treatment as in Example 1-1 was performed for Example 2-1, the same treatment as in Example 1-2 for Example 2-2 and the same treatment as in Example 1-3 for Example 2-3.

Comparative Examples 2-1 to 2-5

In Comparative Examples 2-1 to 2-5, except for changing the waste water 1 to the waste water 2, both shown in Table 1, adding a suspension of slaked lime in such a way as to reach 710 mg/L, and adding aluminum sulfate in such a way as to reach 260 mg/L (0.41 mmol in aluminum concentration), the same treatment as in Comparative Example 1-1 was performed for Comparative Example 2-1, the same treatment as in Comparative Example 1-2 for Comparative Example 2-2, the same treatment as in Comparative Example 1-3 for Comparative Example 2-3, the same treatment as in Comparative Example 1-4 for Comparative Example 2-4 and the same treatment as in Comparative Example 1-5 for Comparative Example 2-5.

The amount of the polymer added in each Example and each Comparative Example, the product of the cationic group percentage and the addition concentration, and the product of the anionic group percentage and the addition concentration, are summarized in Table 3.

TABLE 3

| | Amount of polymer added | Cationic group percentage × addition concentration (mol %·mg/L) | Anionic group percentage × addition concentration (mol %·mg/L) |
|---|---|---|---|
| Example 1-1 Example 2-1 | 1 mg/L of cationic polymer C → 2 mg/L of anionic polymer A | 5 | 8 |
| Example 1-2 Example 2-2 | 1 mg/L of cationic polymer C → 2 mg/L of anionic polymer B | 5 | 44 |
| Example 1-3 Example 2-3 | 1 mg/L of cationic polymer D → 2 mg/L of anionic polymer A | 8 | 8 |
| Comparative Example 1-1 Comparative Example 2-1 | 3 mg/L of anionic polymer A | — | 12 |
| Comparative Example 1-2 Comparative Example 2-2 | 3 mg/L of anionic polymer B | — | 66 |
| Comparative Example 1-3 Comparative Example 2-3 | 3 mg/L of cationic polymer C | 15 | — |
| Comparative Example 1-4 Comparative Example 2-4 | 1 mg/L of cationic polymer E → 2 mg/L of anionic polymer A | 10 | 8 |
| Comparative Example 1-5 Comparative Example 2-5 | 1 mg/L of cationic polymer F → 2 mg/L of anionic polymer A | 45 | 8 |

The pH during granulation, the particle size of the obtained granulated material and the fluoride ion concentration in the treated water of Examples 1-1 to 1-3 and Comparative Examples 1-1 to 1-5 are summarized in Table 4.

TABLE 4

| | Example 1-1 | Example 1-2 | Example 1-3 | Comparative Example 1-1 | Comparative Example 1-2 | Comparative Example 1-3 | Comparative Example 1-4 | Comparative Example 1-5 |
|---|---|---|---|---|---|---|---|---|
| pH during granulation | 7.0 | 7.0 | 7.0 | 7.0 | 7.0 | 7.0 | 7.0 | 7.0 |
| Particle size of granulated material | 10 mm or more | 10 mm or more | 10 mm or more | 3 to 5 mm | 1 mm | 1 mm | 3 to 5 mm | 1 to 3 mm |
| Fluoride ion in treated water (mg/L) | 12 | 12 | 12 | 12 | 12 | 12 | 12 | 12 |

The pH during granulation, the particle size of the obtained granulated material and the fluoride ion concentration in the treated water of Examples 2-1 to 2-3 and Comparative Examples 2-1 to 2-5 are summarized in Table 5.

TABLE 5

| | Example 2-1 | Example 2-2 | Example 2-3 | Comparative Example 2-1 | Comparative Example 2-2 | Comparative Example 2-3 | Comparative Example 2-4 | Comparative Example 2-5 |
|---|---|---|---|---|---|---|---|---|
| pH during granulation | 7.0 | 7.0 | 7.0 | 7.0 | 7.0 | 7.0 | 7.0 | 7.0 |
| Particle size of granulated material | 10 mm or more | 10 mm or more | 5 to 10 mm | 1 to 3 mm | 1 mm | 1 mm | 1 to 3 mm | 1 to 3 mm |

TABLE 5-continued

|  | Example 2-1 | Example 2-2 | Example 2-3 | Comparative Example 2-1 | Comparative Example 2-2 | Comparative Example 2-3 | Comparative Example 2-4 | Comparative Example 2-5 |
| --- | --- | --- | --- | --- | --- | --- | --- | --- |
| Fluoride ion in treated water (mg/L) | 6.3 | 6.3 | 6.3 | 6.6 | 6.3 | 6.4 | 6.3 | 6.3 |

In each Example and each Comparative Example, treated water of good water quality was obtained, but a granulated material with a larger particle size was obtained with each Example than with each Comparative Example. For these reasons, it can be said that it is possible to form a granulated material with a large particle size by setting the amount of the aluminum salt added to an aluminum concentration of 0.4 mmol or more and adding the cationic polymer and the anionic polymer such that the product of the cationic group percentage and the cationic polymer concentration is equal to or less than the product of the anionic group percentage and the anionic polymer concentration, and it can be assumed that this makes it possible to obtain a high solid-liquid separation speed.

Moreover, from the results of Examples 2-1 to 2-3, it can be said that a granulated material with a large particle size can be stably formed by adding the cationic polymer and the anionic polymer such that the cationic polymer concentration×cationic group percentage/anionic polymer concentration×anionic group percentage is equal to or less than 5/8, even if, for example, waste water with a low concentration of dissolved substances (waste water 2) is the subject of treatment.

Example 3-1

The treatment of the waste water 1 shown in Table 1 was performed as follows, using the waste water treatment apparatus shown in FIG. 2.

25 to 250 L/h of the waste water 1 were introduced, and 1650 mg/L of slaked lime and hydrochloric acid were added to a pretreatment tank of a volume of 24 L and were reacted at pH 9.0. Then, the waste water discharged from the pretreatment tank was introduced in a reaction tank of a volume of 24 L and 600 mg/L (0.94 mmol/L in aluminum concentration) of aluminum sulfate and 1 mg/L of cationic polymer C were added and stirred, sodium hydroxide was further added to adjust to pH 7.0, and the reaction was performed. 2 mg/L of the anionic polymer A were added to the waste water discharged from the reaction tank and introduced into the granulating flocculation precipitation tank. The waste water introduced into the granulating flocculation precipitation tank was stirred at a G value of 30/s, the granulation of the insoluble material in the waste water was performed, and a solid-liquid separation of the obtained granulated material was performed to obtain treated water. In the granulating flocculation precipitation tank, the amount of treated water discharged from this tank was varied, the solid-liquid separation speed (linear velocity LV) in the solid-liquid separation tank was changed, the treated water was sampled at each LV, and the turbidity of the treated water was measured.

Moreover, when a pH sensor was installed on the upper part of the dense layer formed in the granulating flocculation precipitation tank and the pH (pH of the dense layer upper part) was measured, the result was 7.4. The pH of the dense layer upper part had the same value in the following Example 3-2 and Comparative Examples 3-1 to 3-3.

Example 3-2

Except for changing the cationic polymer C used in Example 3-1 to the cationic polymer D, the same treatment as in Example 3-1 was performed.

Comparative Example 3-1

Except for not adding the cationic polymer C used in Example 3-1 and changing the addition of the anionic polymer A from 2 mg/L to 3 mg/L, the same treatment as in Example 3-1 was performed.

Comparative Example 3-2

Except for changing the cationic polymer C used in Example 3-1 to the cationic polymer E, the same treatment as in Example 3-1 was performed.

Comparative Example 3-3

Except for changing the cationic polymer C used in Example 3-1 to the cationic polymer F, the same treatment as in Example 3-1 was performed.

The amount of the polymer added in each Example and each Comparative Example, the product of the cationic group percentage and the addition concentration, and the product of the anionic group percentage and the addition concentration, are summarized in Table 6.

TABLE 6

|  | Amount of polymer added | Cationic group percentage × addition concentration (mol %·mg/L) | Anionic group percentage × addition concentration (mol %·mg/L) | pH of dense layer upper part (−) |
| --- | --- | --- | --- | --- |
| Example 3-1 | 1 mg/L of cationic polymer C → 2 mg/L of anionic polymer A | 5 | 8 | 7.4 |
| Example 3-2 | 1 mg/L of cationic polymer D → 2 mg/L of anionic polymer A | 8 | 8 | 7.4 |

TABLE 6-continued

|  | Amount of polymer added | Cationic group percentage × addition concentration (mol %·mg/L) | Anionic group percentage × addition concentration (mol %·mg/L) | pH of dense layer upper part (-) |
|---|---|---|---|---|
| Comparative Example 3-1 | 3 mg/L of anionic polymer A | — | 12 | 7.4 |
| Comparative Example 3-2 | 1 mg/L of cationic polymer E → 2 mg/L of anionic polymer A | 10 | 8 | 7.4 |
| Comparative Example 3-3 | 1 mg/L of cationic polymer F → 2 mg/L of anionic polymer A | 45 | 8 | 7.4 |

Figure 3:
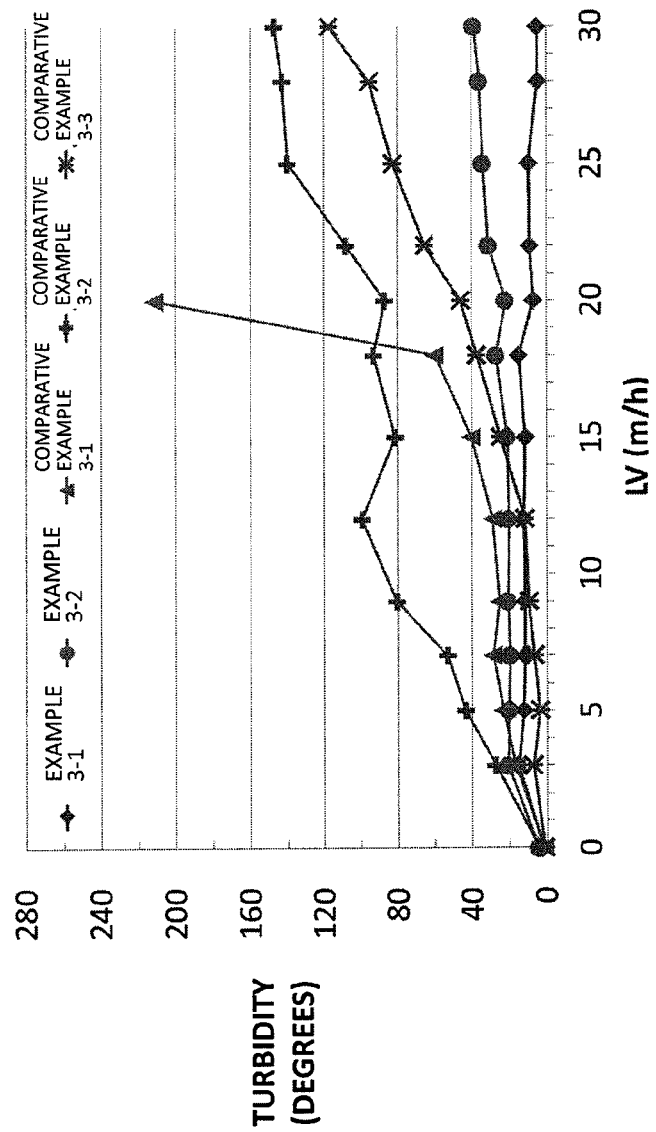
FIG. 3 shows the results of the treated water turbidity with respect to the solid-liquid separation speed (linear velocity) in Examples 3-1 to 3-2 and Comparative Examples 3-1 to 3-3.

FIG. 3 shows the results of the treated water turbidity with respect to the solid-liquid separation speed (linear velocity) in Examples 3-1 to 3-2 and Comparative Examples 3-1 to 3-3.

In Examples 3-1 to 3-2, where the amount of the aluminum salt added was an aluminum concentration of 0.4 mmol or more, and the cationic polymer and the anionic polymer were added such that the cationic group percentage×cationic polymer concentration/anionic group percentage×anionic polymer concentration was 1 or less, the treated water turbidity was 40 degrees or less, even when increasing the linear velocity LV in the granulation type flocculation reaction tank to 30 m/h, since a granulated material with a large particle size and a high sedimentation rate was formed. In contrast, in Comparative Example 3-1 where only an anionic polymer was added, and Comparative Examples 3-2 to 3-3 where the cationic group percentage×cationic polymer concentration/anionic group percentage×anionic polymer concentration exceeded 1, since only a granulated material with a small particle size was formed, the treated water turbidity was 40 degrees or more when the linear velocity LV in the granulation type flocculation reaction tank was 15 to 20 m/h or more, and the treated water turbidity was 100 degrees or more when the LV was further increased.

Example 4-1

The treatment of the waste water 1 shown in Table 1 was performed as follows, using the waste water treatment apparatus shown in FIG. 2.

250 L/h of the waste water 1 were introduced and 1650 mg/L of slaked lime and hydrochloric acid were added to a pretreatment tank of a volume of 24 L, and were reacted at pH 9.0. Then, the waste water discharged from the pretreatment tank was introduced into a reaction tank of a volume of 24 L, 700 mg/L (1.4 mmol/L in aluminum concentration) of polyaluminum chloride were added, stirred and reacted, then 2 mg/L of cationic polymer C were added and stirred, and sodium hydroxide was further added to adjust to pH 8.0 and the reaction was performed. 4 mg/L of the anionic polymer A were added to the waste water discharged from the reaction tank and introduced into the granulating flocculation precipitation tank. The waste water introduced into the granulating flocculation precipitation tank was stirred at a G value of 30/s, the granulation of the insoluble material in the waste water was performed and a solid-liquid separation of the obtained granulated material was performed at a linear velocity (LV) of 30 m/h to obtain treated water.

Moreover, when a pH sensor was installed on the upper part of the dense layer formed in the granulating flocculation precipitation tank and the pH (pH of the dense layer upper part) was measured, the result was 8.3.

Example 4-2

Except for adjusting the amount of sodium hydroxide added in the reaction tank and changing the pH in the reaction tank from 8.0 to 7.5, the same treatment as in Example 4-1 was performed. The pH of the dense layer upper part according to the pH sensor installed on the upper part of the dense layer was 7.9.

Example 4-3

Except for adjusting the amount of sodium hydroxide added in the reaction tank and changing the pH in the reaction tank from 8.0 to 7.0, the same treatment as in Example 4-1 was performed. The pH of the dense layer upper part according to the pH sensor installed on the upper part of the dense layer was 7.4.

Example 4-4

Except for adjusting the amount of sodium hydroxide added in the reaction tank and changing the pH in the reaction tank from 8.0 to 6.5, the same treatment as in Example 4-1 was performed. The pH of the dense layer upper part according to the pH sensor installed on the upper part of the dense layer was 6.9.

Example 4-5

Except for adjusting the amount of sodium hydroxide added in the reaction tank and changing the pH in the reaction tank from 8.0 to 6.0, the same treatment as in Example 4-1 was performed. The pH of the dense layer upper part according to the pH sensor installed on the upper part of the dense layer was 6.5.

The results of the pH in the reaction tank, the pH of the dense layer upper part, the particle size of the obtained granulated material, the SS of the obtained treated water and the fluoride ion concentration are shown in Table 7.

TABLE 7

| | Reaction pH | | Granulated material | Treated water quality | |
|---|---|---|---|---|---|
| | pH in reaction tank (−) | pH of dense layer (−) | Particle size (mm) | SS (mg/L) | Fluoride ion (mg/L) |
| Example 4-1 | 8.0 | 8.3 | 8 to 9 | 3.9 | 12 |
| Example 4-2 | 7.5 | 7.9 | 8 to 10 | 3.9 | 13 |
| Example 4-3 | 7.0 | 7.4 | 7 to 8 | 5.6 | 12 |
| Example 4-4 | 6.5 | 6.9 | 5 to 6 | 6.7 | 12 |
| Example 4-5 | 6.0 | 6.5 | 5 to 6 | 12 | 15 |

In any of Examples 4-1 to 4-5, the pH of the dense layer upper part is higher than the pH in the reaction tank, but this is thought to be because the undissolved slaked lime dissolved and released hydroxide ions in the process from the reaction tank to the dense layer.

When the pH of the dense layer upper part is in the range of 6.5 to 8.3, the higher the pH of the dense layer upper part is, the larger the particle size of the granulated material tends to be, and the better the SS of the treated water tends to be. Especially, the SS of the treated water was much better when the pH of the dense layer upper part was in the range of 7.4 to 8.3 as in Examples 4-1 to 4-3. The pH of the dense layer upper part had almost no impact on the fluoride ion concentration of the treated water and the fluoride ion concentration did not increase even at a high pH.

REFERENCE SIGNS LIST

1, 2 Waste water treatment apparatus, 10 Insoluble material-generating apparatus, 12 Anionic polymer flocculant addition line, 14 Solid-liquid separation apparatus, 16 Reaction tank, 18 Inorganic flocculant addition line, 20 Cationic polymer flocculant addition line, 22, 58 pH adjuster addition line, 24, 28, 60 Stirrer, 26 Granulating flocculation precipitation tank, 30 Main body part, 32 Sludge discharge part, 34 Opening part, 36 Stirring blade, 38 Treated water extraction part, 40, 62 Waste water inflow line, 42 Waste water discharge line, 44, Treated water discharge line, 46 Sludge discharge line, 48 Dense layer, 50 Granulated material, 52 Pretreatment apparatus, 54 Pretreatment tank, 56 Calcium agent addition line.

The invention claimed is:

1. A waste water treatment method comprising:
generating an insoluble material by adding at least either one of an iron salt and an aluminum salt, and a cationic polymer flocculant, to waste water containing dissolved material;
adding an anionic polymer flocculant to the waste water comprising the insoluble material;
granulating the insoluble material by stirring the anionic polymer flocculant and the waste water comprising the insoluble material; and
performing a solid-liquid separation of the generated granulated material to obtain treated water;
wherein the amount of the iron salt or the aluminum salt added is an iron or aluminum concentration of 0.4 mmol/L or more,
wherein the cationic polymer flocculant and the anionic polymer flocculant are added such that the product of the cationic polymer flocculant concentration and the cationic group percentage is equal to or less than the product of the anionic polymer flocculant concentration and the anionic group percentage,
wherein the product of the cationic polymer concentration and the cationic group percentage, divided by the product of the anionic polymer concentration and the anionic group percentage is equal to or less than 5/8, and
wherein the cationic group percentage of the cationic polymer flocculant is in the range of 1 mol % to 8 mol %.

2. The waste water treatment method according to claim 1, wherein the pH of the waste water in the granulation step is in the range of 7.4 to 8.5.

3. The waste water treatment method according to claim 1, wherein the amount of the iron salt or the aluminum salt added is an iron or aluminum concentration of 0.4 mmol/L or more and 3 mmol/L or less.

4. The waste water treatment method according to claim 1, wherein the amount of the iron salt or the aluminum salt added is an iron or aluminum concentration of 0.4 mmol/L or more and 2 mmol/L or less.

* * * * *